US006327473B1

(12) United States Patent
Soliman et al.

(10) Patent No.: US 6,327,473 B1
(45) Date of Patent: Dec. 4, 2001

(54) METHOD AND APPARATUS FOR INCREASING THE SENSITIVITY OF A GLOBAL POSITIONING SATELLITE RECEIVER

(75) Inventors: Samir S. Soliman; Serguei A. Glazko; Parag A. Agashe, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/149,428

(22) Filed: Sep. 8, 1998

(51) Int. Cl.$^7$ ........................................... H04Q 7/20
(52) U.S. Cl. ............................... 455/456; 342/357.06
(58) Field of Search ........................... 455/502, 456, 455/457, 265; 342/357.06; 701/213; 375/137, 134, 140; 370/320, 335, 342

(56) References Cited

U.S. PATENT DOCUMENTS

| | | | |
|---|---|---|---|
| 4,701,934 | * 10/1987 | Jasper | 342/357.1 |
| 5,319,374 | * 6/1994 | Desai et al. | 342/387 |
| 5,420,592 | * 5/1995 | Johnson | 342/357 |
| 5,617,410 | * 4/1997 | Matsumoto | 370/342 |
| 5,663,734 | 9/1997 | Krasner | 342/357 |
| 5,722,081 | * 2/1998 | Tamura | 455/502 |
| 5,828,659 | * 10/1998 | Teder et al. | 370/328 |
| 5,893,044 | * 4/1999 | King et al. | 342/357 |
| 5,920,278 | * 7/1999 | Tyler et al. | 342/33 |
| 5,945,944 | * 8/1999 | Krasner | 342/357.06 |
| 5,983,113 | * 11/1999 | Asanuma | 455/506 |
| 6,014,548 | * 1/2000 | Balachandran et al. | 455/13.2 |
| 6,031,487 | * 2/2000 | Mickelson | 342/357.06 |

FOREIGN PATENT DOCUMENTS 9714057   4/1997   (EP) ................. G01S/5/14

OTHER PUBLICATIONS

Soliman et al., "GPS Receiver Sensitivity Enhancement in Wireless Applications", 1999, IEEE MTT–S International Topical Symposium on Technologies for Wireless Applications, pp. 181–186.

Van Nee, et al., "New Fast GPS Code–Acquisition Technique Using FFT", 1991, Electronics Letters, GB, IEE Stevenage, vol. 27, NR. 2, pp. 158–160.

Mitel Semiconductor poduct specification sheet in 22 pages (May 1996).

* cited by examiner

Primary Examiner—Lee Nguyen
(74) Attorney, Agent, or Firm—Philip Wadsworth; Charles D. Brown; Bruce W. Greenhalls

(57) ABSTRACT

Method and apparatus providing enhanced sensitivity for GPS receivers by allowing coherent integration of a correlation over several code periods of a GPS signal in one embodiment, and by performing a time to frequency domain conversion to the output from a correlation processor in a second embodiment. In the case in which coherent integration is performed over several code periods, advantage is taken of the fact that CDMA cellular telephone base stations transmit information that allows the receiver to determine GPS time before beginning a GPS signal acquisition process. The integration can be expanded to include code periods from more than one bit period, if the GPS receiver takes advantage of the fact that known bit patterns are transmitted at particular times within the transmission from a GPS satellite. If no base station is within range, then the output from a correlator that integrates a correlation over one code period is used to generate values that are input to in a discrete time domain to frequency domain transform. The output from the transform will indicate the presence of a signal from a particular satellite and the offset between locally generated signal and the received GPS signal.

18 Claims, 9 Drawing Sheets

METHOD AND APPARATUS FOR INCREASING THE SENSITIVITY OF A GLOBAL POSITIONING SATELLITE RECEIVER

TECHNICAL FIELD

This invention relates to a method and apparatus for determining the position of a device based on information broadcast from a satellite, and more specifically to a method and apparatus for increasing the sensitivity of a global positioning system receiver.

BACKGROUND ART

The use of a global positioning system (GPS) to determine the location of people and objects is becoming wide spread. Automobiles, wireless telephones and other devices are being designed to include global positioning system receivers. These receivers are used to receive signals from satellites. These received signals provide information that allows the receiver to determine the receiver's location on earth with relatively great accuracy. The signals that are received from the satellites are typically rather weak. Therefore, in order to determine the position of the receiver, the receiver must be sufficiently sensitive to receive these weak signals and interpret the information that is represented by them.

In accordance with the format that is used for one such GPS, the signals transmitted by each satellite are encoded to distinguish the signals transmitted by one satellite from the signals transmitted by the other satellites in the system. The codes that are assigned to each satellite are selected such that the receiver can apply a received signal that includes a signal transmitted from a particular satellite and a particular code associated with the particular satellite to a "correlator" and have only the energy of the signal that is encoded with that particular code emerge from the correlator.

FIG. 1 is an illustration of the timing of a portion of a signal 101 transmitted from a global positioning satellite, such as those in common use today. The transmitted signal 101 shown in FIG. 1 is encoded with a particular code having a duration of 1 millisecond (i.e., the "code period"). The signal is modulated with the code (i.e., the code and the information signal to be transmitted are logically exclusively ORed) every code period. Initially, the receiver determine whether a signal being transmitted from a particular satellite is being received. This is commonly referred to as "acquiring" a satellite. This is done by attempting to "correlate" the received signal with the code associated with that particular satellite (i.e., inputting the received signal and the particular code to the correlator to see if any of the energy in the received signal was encoded with the particular code). In order for the input signal and the code to be correlated, the code period of the signal being received and the code to which the received signal is being compared must be very closely aligned in time. FIG. 1 shows three attempts to correlate the received signal 101 with a code associated with a particular satellite. In the first attempt, the code 102a starts after the beginning of the code period 103 of the received signal 101. Therefore, this first attempt to correlate the received signal with the particular code will fail.

In a second attempt to correlate the received signal 101 with the particular code 102b (which has the same value as the code 102a, but is shifted in time), the code is shifted to a point later in time with respect to the beginning of the code period 103. However, the beginning of the code period of the received signal and the beginning of the code 102 are still not aligned. Therefore, even though the correct code is being compared to the received signal, the timing is not aligned. Accordingly, the attempt to correlate the received signal with the particular code fails again.

In the third attempt, the beginning of the code 102c is aligned with the beginning of a code period 103. The particular code is the same as the code with which the received signal was encoded and the code period 104 is aligned with the code 102c. Therefore, the correlation between the particular code and the received signal will be successful, assuming that the signal that was encoded with the particular code is being received with sufficient strength to allow the correlation to be detected.

However, in many cases, the signal being transmitted from a satellite is not sufficiently strong. This may be due to the fact that the amount of interference is too great or the signal is attenuated by obstructions, such as buildings, foliage, etc. Therefore, the correlation may not be detected, even when the timing is correct and the correct code is selected.

One way that has been proposed for improving the sensitivity of the receiver is to add the power that is transmitted in several code periods together and then attempt to correlate the sum of these code periods with the particular code of interest. In addition to the lack of sensitivity, the time at which the code periods begin is not known. Therefore, the same searching function must be performed as was illustrated in FIG. 1 and described in the accompanying text. This searching requires a relatively large amount of time.

One method that has been proposed for dealing with the amount of time required to determine the alignment of the code periods requires that several samples be taken for a number of "code sample periods". A code sample period is a period of time that is equal in duration to the code period, but which may not be aligned to a code period. The same number of samples are taken for each code sample period (e.g., 1 millisecond). Corresponding samples from each of these 1 millisecond code sample periods are then summed together to form a composite code sample period of 1 millisecond. FIG. 3 is an illustration of four code periods 301, 302, 303, 304 that are sampled 15 times each. The 15 samples from each of the four code periods 301, 302, 303, 304 are summed to form a composite code sample period 305. It should be understood that each such period 301, 302, 303, 304 must begin an integer number of code periods apart and preferably each such period is adjacent in time to one of the other such periods to form a contiguous stream of samples.

The composite code sample period is then transformed from the time domain to the frequency domain. That is, a time domain to frequency domain transform, such as a Fourier transform, is performed on the samples that make up the composite code sample period. The frequency domain result is then multiplied by a frequency domain representation of the particular code to which the received signal is to be correlated. A transform from the frequency domain to the time domain, such as an inverse Fourier transform, is then performed on this product. The time domain result provides an indication as to relative time difference between the beginning of the code sample periods and the beginning of the actual code periods of the received signal, assuming that the received signal has sufficient energy which has been encoded with the particular code.

One problem with this approach is that the information that is represented by the received signal, changes the state of the received signal at regular intervals which are several times longer than the code period. For example, in the GPS system commonly used in the United States, the content of a signal transmitted from a satellite has a bit length of 20 code periods (i.e., 20 ms). This has the effect of potentially inverting the state of the energy that is represented by the codes every 20 milliseconds. FIG. 2 illustrates the timing of a bit with respect to a code period. If energy in the signal received during a code period when the bit value is equal to a logical "one" is added to the energy received when the bit value is equal to a logical "zero", the total energy will be equal to zero. Therefore, "bit boundaries" 201 must be known in order to sum the energy of more than one code period. In addition, if the clock (oscillator) that is used to determine when to take the samples from each code sample period is not extremely stable, then the correlation will not be very good in the frequency domain. This will result in a loss of sensitivity, since the composite code sample period will not correlate well with the particular code of interest.

The present invention provides a method and apparatus which increases the sensitivity of a GPS receiver with less need for an extremely stable clock than is required in the case in which composite code samples periods are generated. In addition, the present invention provides a method for determining the location of bit boundaries within the received signal.

SUMMARY OF THE INVENTION

The disclosed method and apparatus provides enhanced sensitivity for GPS receivers by allowing coherent integration of a correlation over several code periods of a GPS signal in one embodiment, and by performing a time to frequency domain conversion to the output from a correlation processor in a second embodiment.

In the case in which coherent integration is performed over several code periods, the method and apparatus take advantage of the fact that CDMA cellular telephone base stations transmit information that allows the receiver to determine GPS time before beginning a GPS signal acquisition process. Once GPS time is known, the GPS receiver knows when each code period and each bit period begins. With this information, the GPS receiver can start an integration of the output of a correlator and continue to integrate the output from the correlator over several code periods, since the GPS receiver knows the location of the bit boundaries. The integration can even be expanded further to include code periods from more than one bit period, if the GPS receiver takes advantage of the fact that known bit patterns are transmitted at particular times within the transmission from a GPS satellite.

In one embodiment of the disclosed method and apparatus, a code division multiple access (CDMA) cellular telephone is used to determine the GPS time if a CDMA cellular telephone base station is within range. If no base station is within range, then either a conventional process for searching for a GPS satellite signal can be used, or more preferably, the output from a correlator which integrates a correlation over one code period is used to generate values that are input to in a discrete time domain to frequency domain transform, such as a discrete Fourier transform. The output from the transform will indicate the presence of a signal from a particular satellite and the offset between locally generated signal and the received GPS signal.

BRIEF DESCRIPTION OF THE DRAWING

It should be noted that like reference numbers refer to like elements.

DETAILED DESCRIPTION

Figure 4:
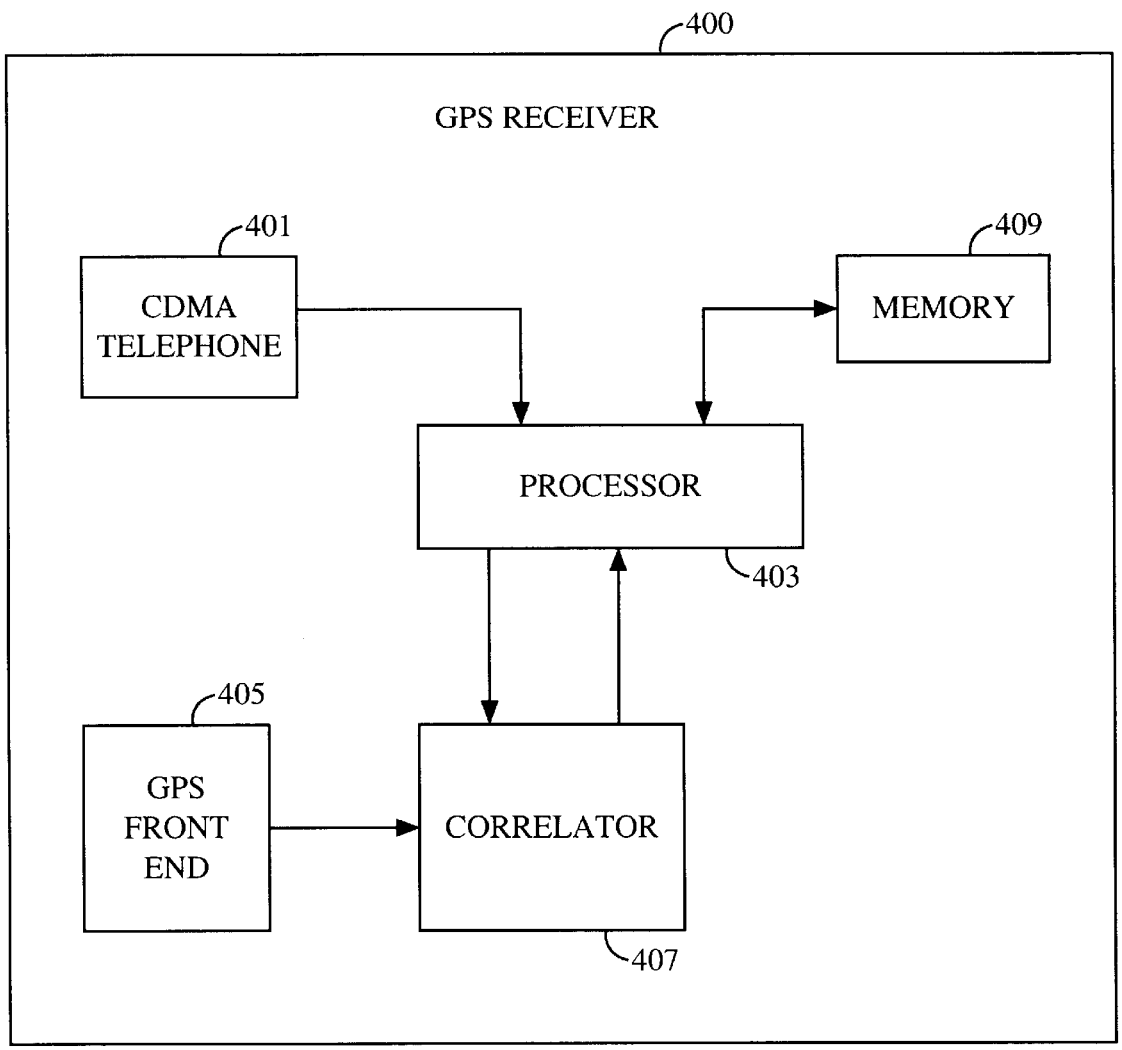
FIG. 4 is a simplified block diagram of one embodiment of the disclosed apparatus.

FIG. 4 is a simplified block diagram of one embodiment of the disclosed apparatus. The embodiment disclosed in FIG. 4 represents a global positioning system (GPS) receiver 400. The GPS receiver 400 includes a code division multiple access (CDMA) cellular telephone 401, a processor 403, a global positioning system (GPS) front end 405, a correlator 407, and memory 409.

In accordance with the embodiment of the disclosed method and apparatus shown in FIG. 4, a GPS signal is received by the GPS front end 405 from a GPS satellite (not shown). The output from the GPS front end 405 is an IF spread-spectrum signal. Alternatively, the output from the GPS front end 405 is a baseband spread-spectrum signal. Such GPS front ends are well known in the art. The output from the GPS front end 405 is coupled to the correlator 407.

The correlator 407 performs a correlation function to determine the amount of correlation between the output from the GPS front end 405 and a predetermined locally generated signal that is encoded with a predetermined code associated with one of the satellites in the GPS system. It will be understood by those skilled in the art that a strong correlation between the output from the GPS front end 405 and the locally generated signal will indicate that the receiver 400 is receiving a signal from a satellite. The particular satellite will be known by the code with which the locally generated signal is encoded.

Figure 1:
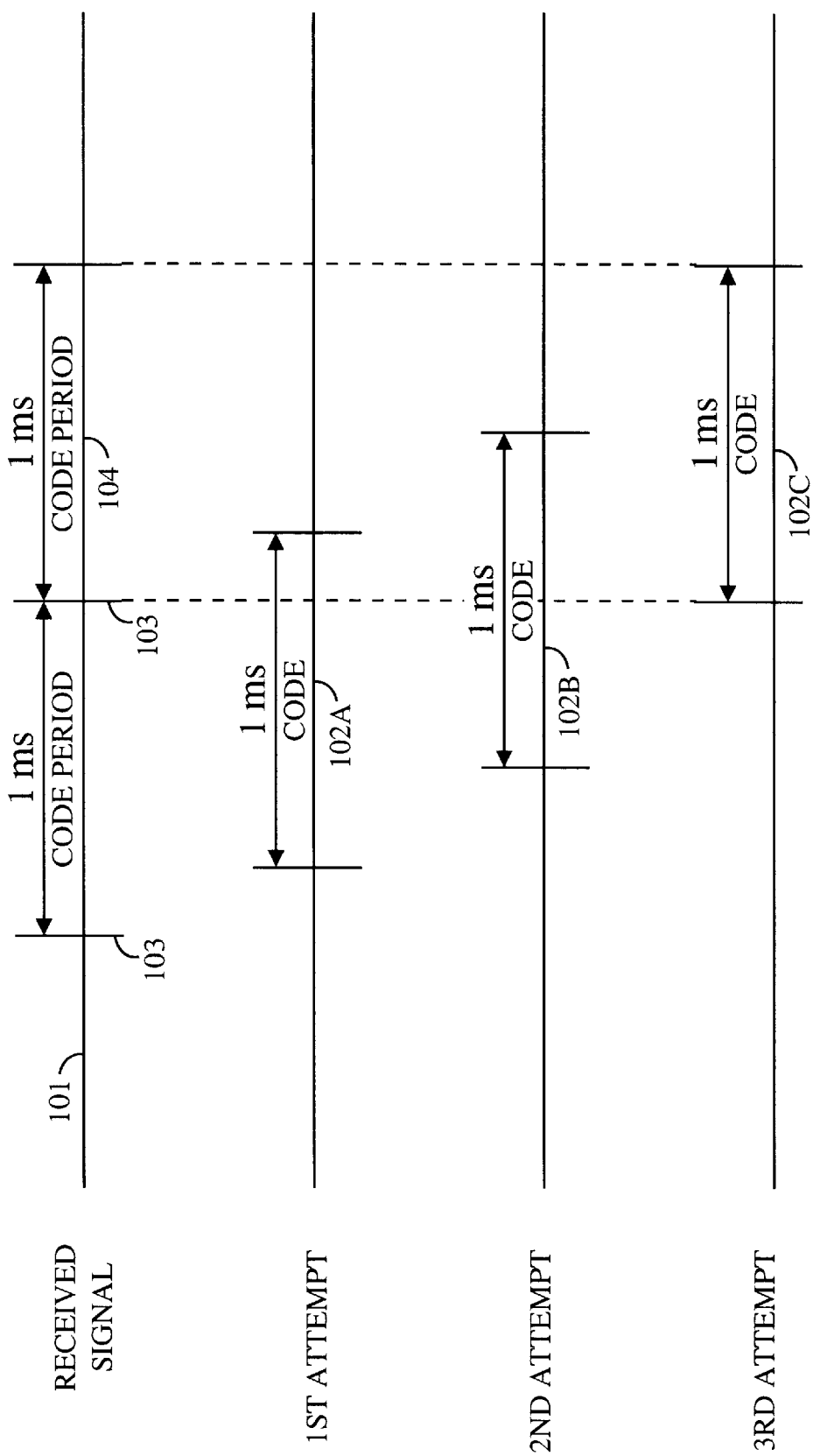
FIG. 1 is an illustration of the timing of a portion of a signal transmitted from a global positioning satellite, such as those in common use today.
Figure 2:
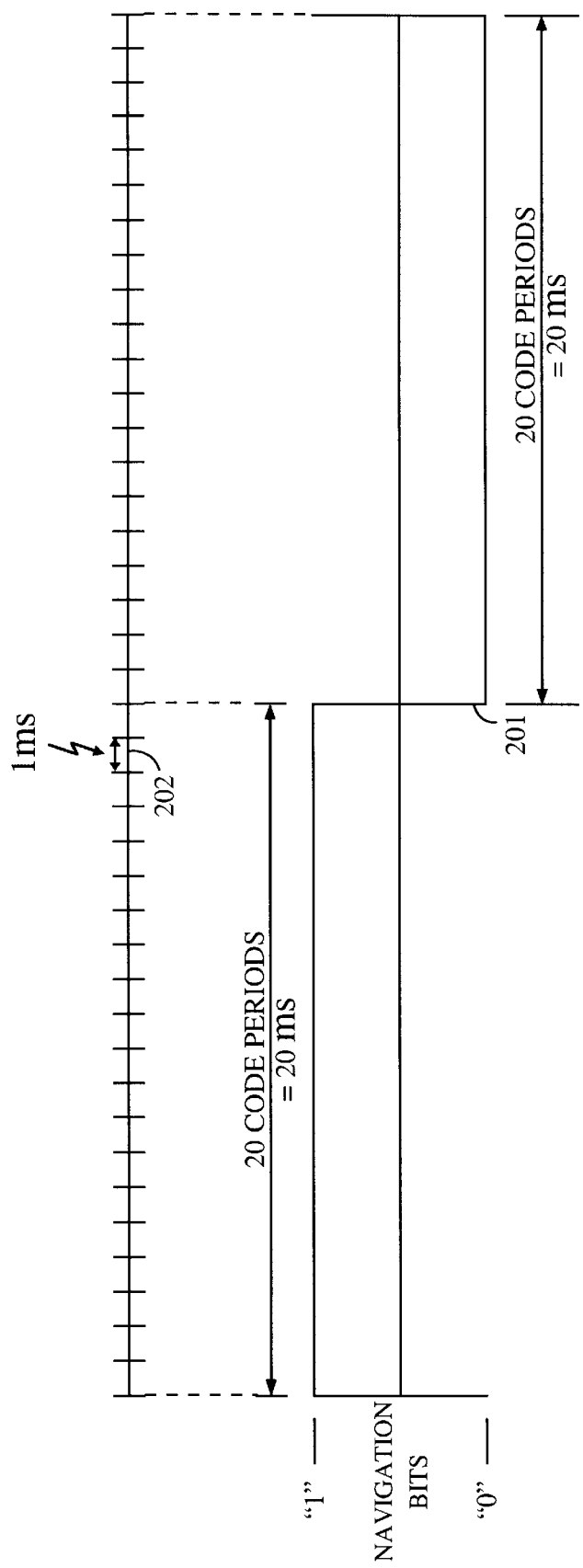
FIG. 2 illustrates the timing of a bit with respect to a code period.
Figure 3:
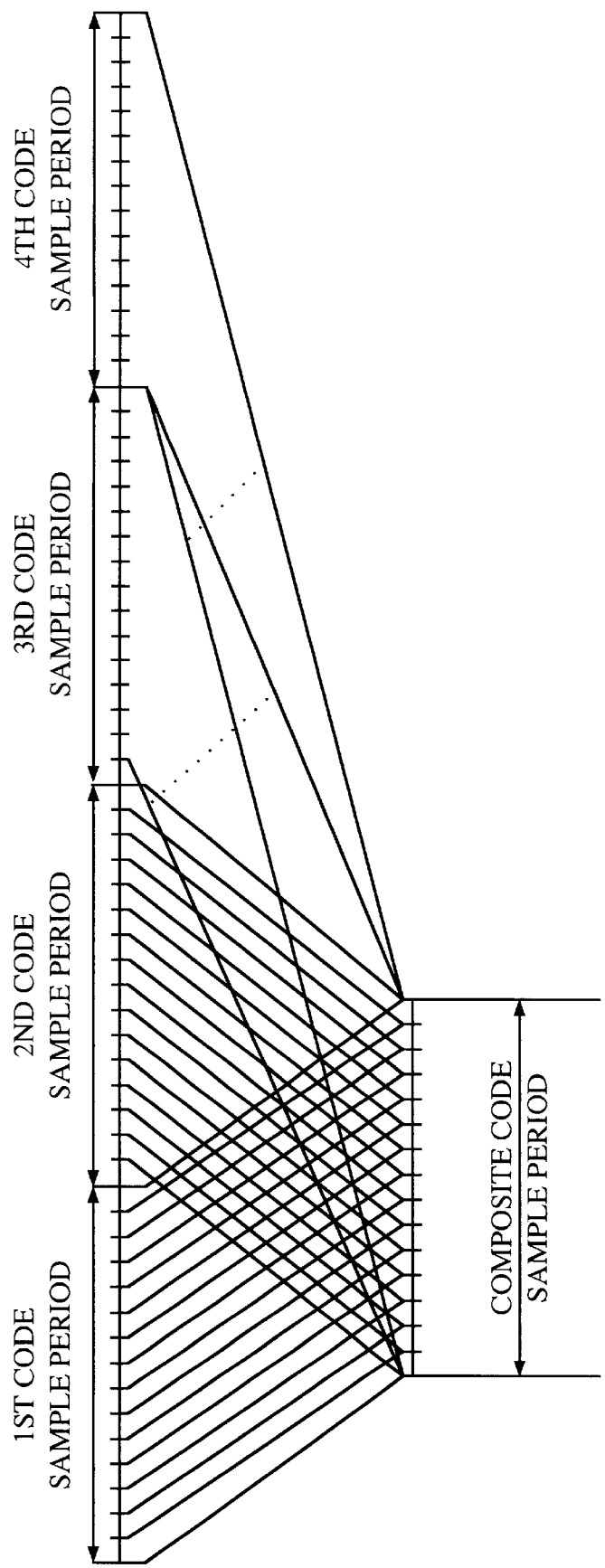
FIG. 3 is an illustration of four code periods that are sampled 15 times each.

Furthermore, a strong correlation will only occur if the locally generated signal is "aligned" with the received GPS signal. That is, as shown in FIG. 2, the GPS signal comprises a series of code periods 202. Each code period starts at the time the previous code period ends. Likewise, the locally generated signal is encoded with the code associated with one of the satellites in the GPS system, such that the code period of the locally generated signal is equal in length to the code period of the signal transmitted by the satellite associated with that code. When the code periods of the locally generated signal and the signal received from a satellite associated with that code start at the same time with respect to one another, then the two signals are said to be aligned.

In accordance with one embodiment of the disclosed method and apparatus, the CDMA cellular telephone 401 is used to receive information from a CDMA base station (not shown) which is part of a CDMA wireless cellular telephone network. The CDMA base station transmits information that indicates "CDMA system time", which is related to "GPS time". Therefore, the received information is processed by the processor 403 to determine the timing of the signals transmitted from each GPS satellite. The processor receives information that indicates CDMA system time. However, to accurately determine GPS time, the processor 403 must adjust the CDMA system time received from the base station to remove an offset that is added by the delay in the transmission of the GPS time from the base station to the GPS receiver 400. This adjustment is made by measuring the round trip delay for a signal being transmitted from the GPS receiver to the base station and back. When the GPS receiver 400 is attempting to receive signals from a particular satellite, the correlator 407 receives information from the processor 403. The information indicates to the correlator 407 which code the locally generated signal should be encoded with, and what the timing of the locally generated signal should be in order to aligned the locally generated signal with the signal being transmitted from the desired satellite. Since the timing of the signal being transmitted from the desired satellite is known, the output of the correlator can be integrated over several code periods. That is, as long as the processor 403 knows the timing of the signal being transmitted from the satellite, the correlator can coherently integrate the results of the correlation function over several code periods (i.e., up to 20 in the currently implemented GPS system). Furthermore, the times at which bit boundaries 201 (see FIG. 2) occur in the information bits of the signal being transmitted by the satellite transition (i.e., change logical state) can also be determined by the processor 403 from the information that is received from the CDMA cellular telephone 401. Therefore, the number of code periods that can be coherently integrated is equal to the number of code periods in one "bit time". A bit time is equal to the length of a bit. FIG. 2 shows a bit time that is equal to 20 code periods.

Even more advantageously, if there is a bit pattern which is known to occur in the signal that is transmitted from the satellite, then the bit values can be taken into account in the process of coherently integrating the output from the correlator 407. Thus, coherent integration can occur over more than one bit period. For example, in the GPS system that is in common use in the U.S., an 8-bit preamble in the telemetry word in each subframe is a good candidate. The value of these 8 bits is known and therefore, may be stored in the memory 413 for access by the processor 403. Similarly, other such patterns could be used.

Figure 5:
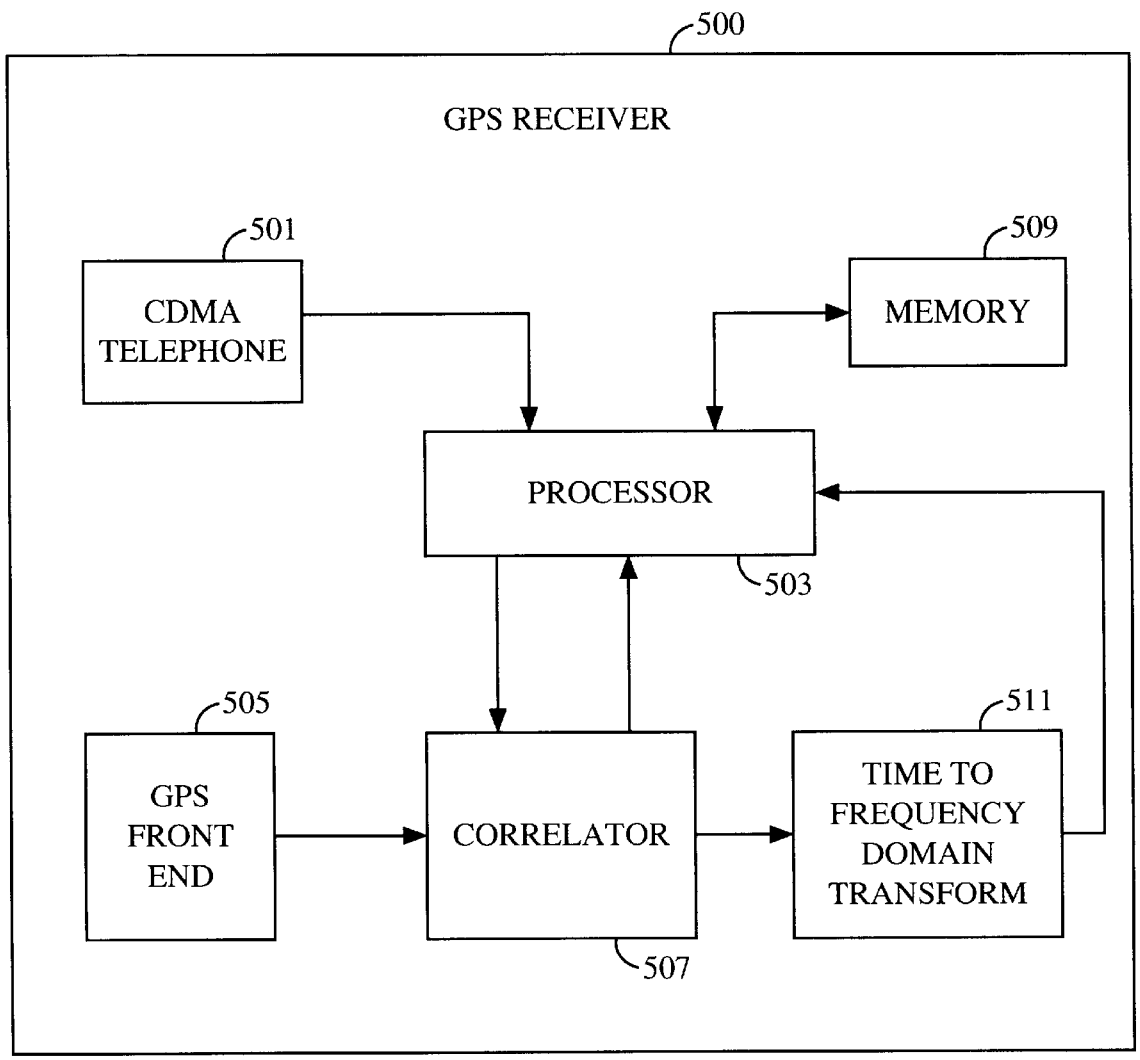
FIG. 5 is a simplified block diagram of another embodiment of the disclosed apparatus.

FIG. 5 is a simplified block diagram of another embodiment of the disclosed apparatus. The embodiment disclosed in FIG. 5 represents a GPS receiver 500. The GPS receiver 500 includes a CDMA cellular telephone 501, a processor 503, a GPS front end 505, a correlator 507, memory 509, and a time to frequency domain transform processor 511.

The embodiment of the apparatus illustrated in FIG. 5 operates essentially as described above in connection with the embodiment of the apparatus disclosed in FIG. 4. However, in the embodiment of the apparatus illustrated in FIG. 5, the output from the correlator 507 is coupled to a time domain to frequency domain transform processor 511. The output from the correlator 507 is used to form a vector of values. The size of the vector, N, is equal to the number of code periods used to produce the correlator output. An N point discrete Fourier transform of the vector is taken using a fast Fourier transform or by software post-processing, as is well known in the art. Any other method for performing a time to frequency domain transformation would be equally useful. The output from the transform processor 511 indicates how strongly the received signal correlates with the locally generated signal. In addition, the particular frequency at which the peak value occurs indicates the offset in frequency of the locally generated signal from the signal that is received from the satellite of interest (i.e., the satellite associated with the code with which the locally generated signal was encoded). The process provides a processing gain nearly equal to N.

In addition, in the embodiment of the disclosed apparatus shown in FIG. 5, the frequency offset that is determined by the frequency at which the peak energy is detected at the output of the transform processor 511 can be used to adjust the oscillator which determines the frequency of the locally generated signal.

In addition, the use of a time to frequency domain transform processor provides a strong indication of correlation even when a bit transition occurs such that some of the code periods correlate during a first logical state, and others correlate during a second logical state. In fact, the use of the time to frequency domain processor provides an indication as to when a bit transition occurred within the N code periods that are correlated. That is, the particular pattern of side lobes which form around the peak at the output from the transform processor 511 provide information as to when the bit transition took place. Note that if the bit transition took place after exactly half the code periods were correlated, such that one half of the code periods were correlated with a logical one as the information bit logical state, and the other half of the code periods were correlated with a logical zero as the information bit logical state, then the output from the correlator would essentially be a square wave. Accordingly, the output from the transform processor would have side lobes at odd harmonics, as is characteristic of the frequency domain representation of a square wave with 50% duty cycle.

Figure 6:
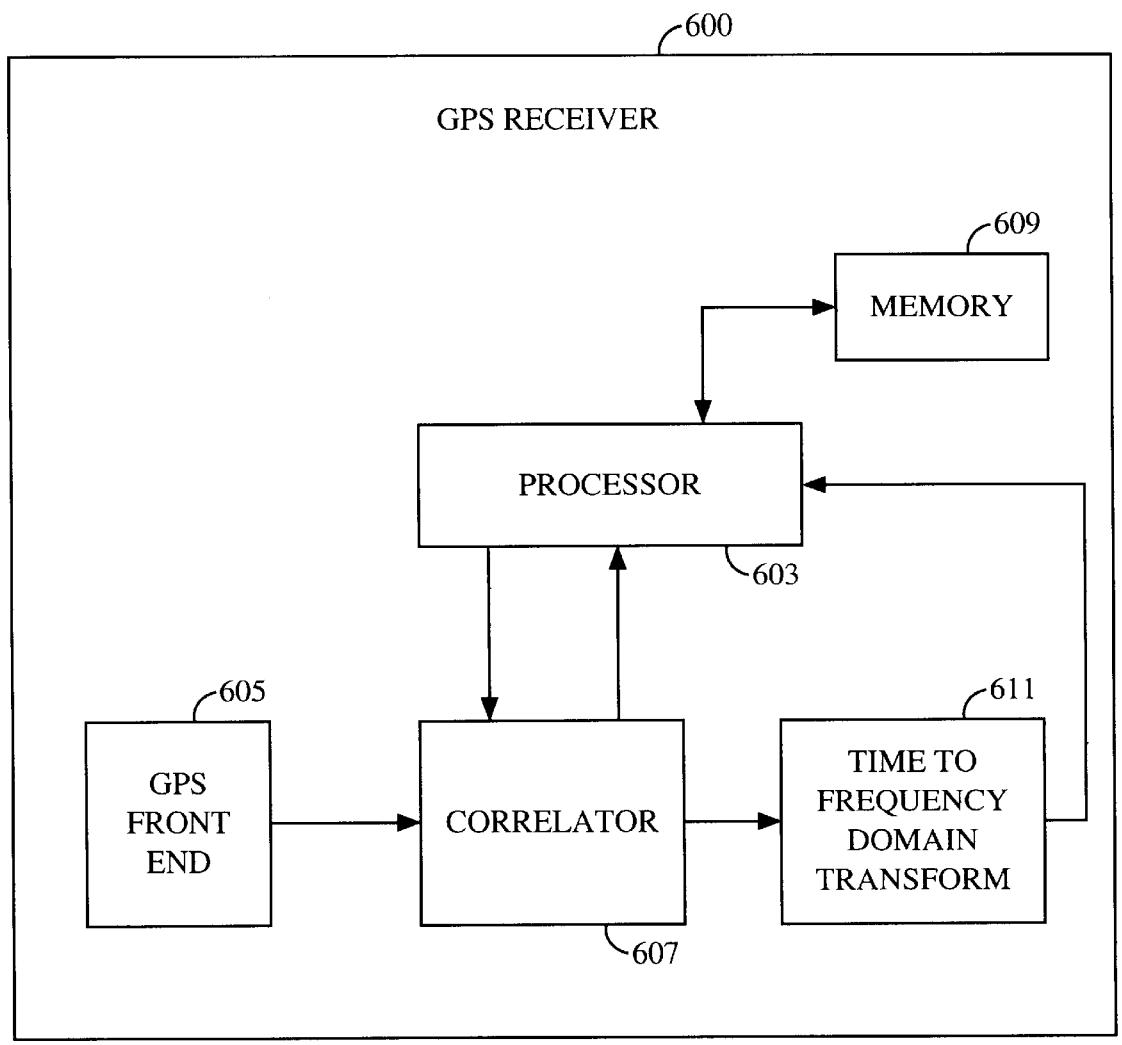
FIG. 6 is a simplified block diagram of a GPS receiver that does not have a CDMA telephone as part of the GPS receiver.

A transform processor can be useful regardless of whether GPS time is available to provide alignment of the locally generated signal with the desired GPS signal. In fact, the transform processor is particularly useful when GPS time is not available. For example, FIG. 6 is a simplified block diagram of a GPS receiver 600 that does not have a CDMA telephone as part of the GPS receiver 600. The GPS receiver 600 includes a processor 603, memory 609, GPS front end 605, correlator 607, and time to frequency domain transform processor 611.

Since the GPS receiver 600 does not have a CDMA telephone, the GPS receiver 600 cannot determine GPS time prior to acquiring the signals (i.e., determining the timing of the signals) from the GPS satellites. However, use of the transform processor 611 makes it unnecessary to align the locally generated signal and the received satellite signal. This is because there is an assumption that there will be at least some frequency difference between the locally generated signal and the signal received from a GPS satellite. This difference will cause the locally generated signal to "beat" in and out of alignment with the signal received from the satellite at a rate that is equal to the offset between the two signals. It is this offset frequency that will be detected by the transform processor output. In addition, as noted before, the fact that the bit boundaries are not known does not greatly complicate the detection of the received GPS signal, since the relative location of the bit boundaries can be determined from the output of the transform processor 611. However, due to the presence of bit transitions, the technique may suffer at most a 2-dB degradation compared to the coherent integration that occurs when the timing is known from the CDMA telephone in the other embodiments.

It should be noted that the apparatus illustrated in FIG. 5 may determine whether GPS time can be attained from a CDMA base station. If signals from a CDMA base station are not available, then the time to frequency transform processor 511 may be used. However, if the GPS receiver 500 can receiver CDMA signals and thus, can determine GPS time, then the output from the correlator may be used directly without the need to perform a time to frequency transform, since the GPS receiver 500 will be able to align the received GPS signals with the locally generated signals using GPS time. Nonetheless, the use of the transform processor 511 allows for correction of frequency uncertainty. That is, when the frequency of the locally generated signal differs from the frequency of the received GPS signal, the correlation over several code periods will degrade for the later code periods. By determining the offset between the frequency of the locally generated signal and the signal received from the GPS satellites, this can be corrected, either by controlling the frequency of the locally generated signal, or by periodic corrections within the correlator.

Figure 7:
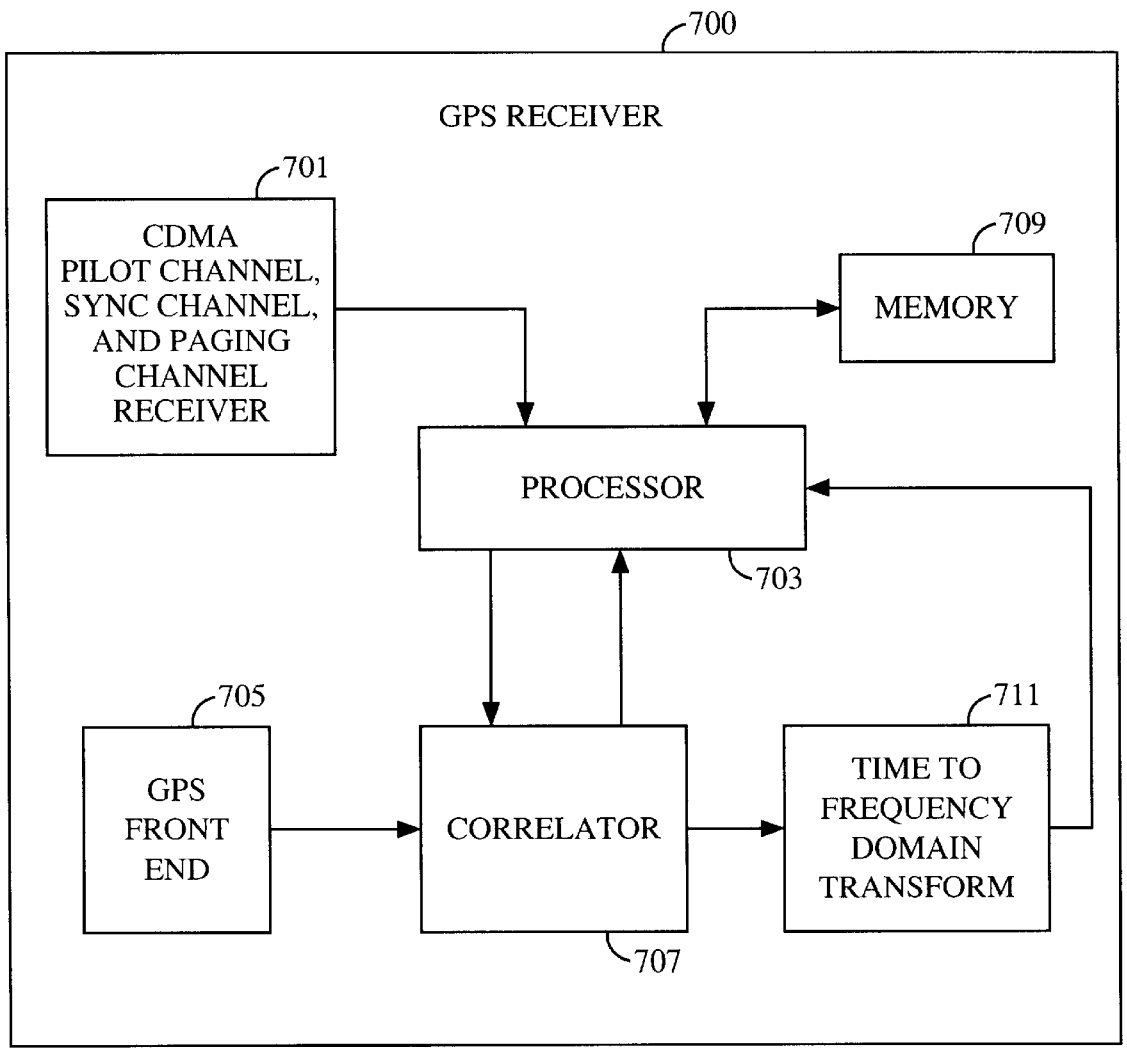
FIG. 7 is a simplified block diagram of another embodiment of the disclosed apparatus.

In another embodiment of a GPS receiver 700, shown in FIG. 7, a CDMA pilot channel, sync channel, and paging channel receiver 701 are used to detect CDMA signals which indicate the identity of a base station from which such signals originate. This embodiment also includes a processor 703, a GPS front end 705, a correlator 707, memory 709, and a time to frequency domain transform processor 711.

By knowing the identity of the base station from which such signals received by the GPS receiver 700 were transmitted, the location of a base station can be determined by a look-up table within the GPS receiver 700. The location of the GPS receiver is then known to within a distance equal to the distance from which the GPS receiver 700 can receive signals transmitted by the base station.

It should be noted that CDMA system time can be determined from the signals received from the base station. However, GPS time cannot be determined accurately because of the offset in time that is imposed by the propagation of the signal from the base station to the GPS receiver. It should be noted that this offset is accounted for in the embodiment in which the GPS receiver includes a CDMA telephone by measuring the round trip delay. However, without a transmitter in the GPS receiver 700, the round trip delay between the base station and the CDMA receiver cannot be measured. Nonetheless, the offset in time created by the propagation of that information from the base station to the GPS receiver is relatively small with respect to the time it takes a satellite to move into or out of view. Therefore, by receiving CDMA system time and the location of the nearest CDMA base station that can be received, the GPS receiver 700 can check a stored almanac. The information in the almanac can then be used to determine which satellites are likely to be in view (i.e., from which satellites the GPS receiver 700 is likely to be able to receive signals). Determining which satellites are in view can greatly reduce the amount of search time required to acquire a GPS satellite.

Figure 8:
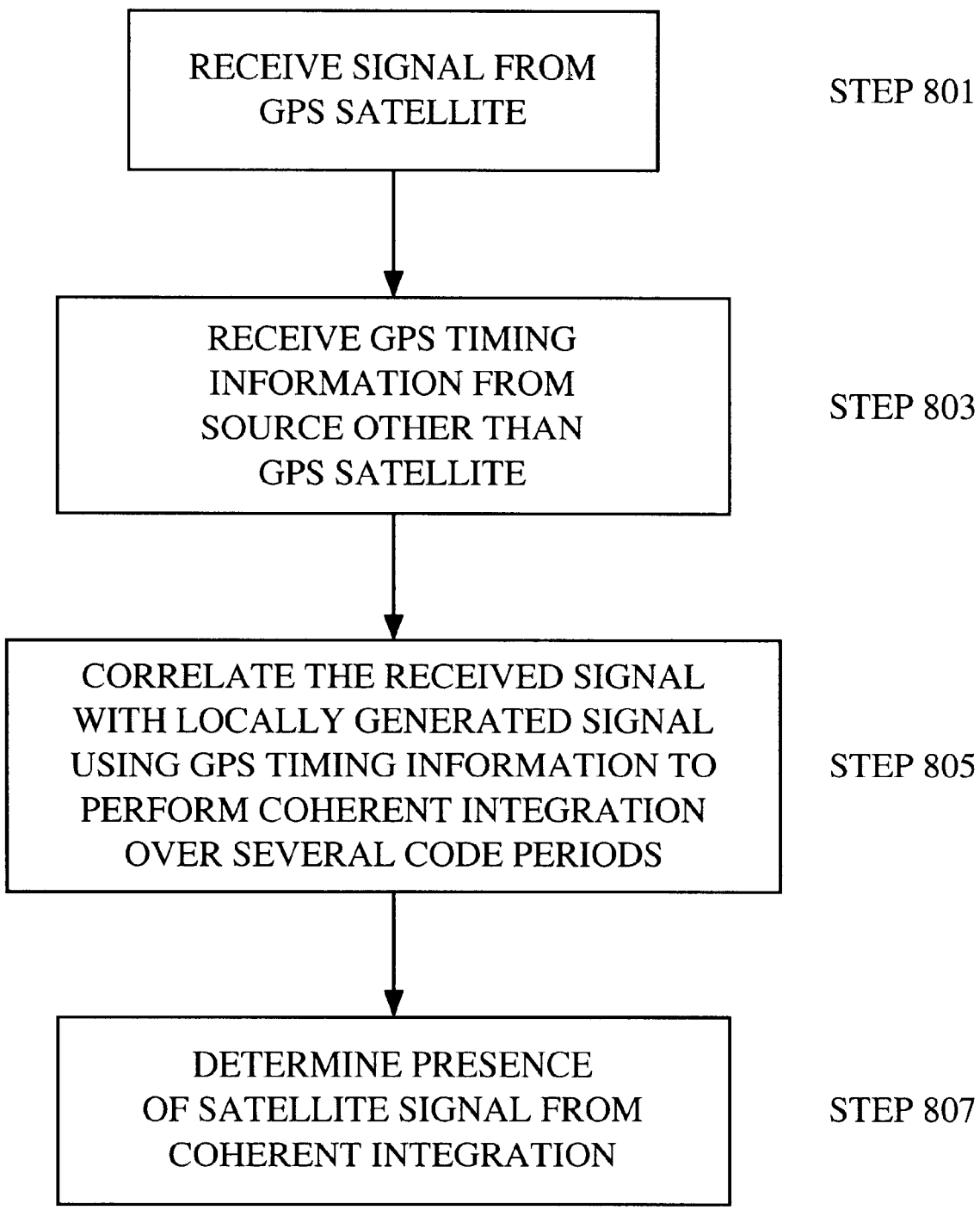
FIG. 8 is a flowchart that illustrates one embodiment of the disclosed method.

FIG. 8 is a flowchart which illustrates one embodiment of the disclosed method. A signal is received from a GPS satellite by the GPS receiver 400 (STEP 801). In addition, GPS timing information is received from a source other than the GPS satellite (i.e., a "non-GPS source", such as a CDMA base station (STEP 803). In the case in which the GPS timing information is received from a CDMA base station, the information is received by a CDMA cellular telephone 401. The received GPS signal received from the satellite by the GPS receiver 400 is correlated with a locally generated signal (STEP 805). The timing information that is received from the non-GPS source is used to establish the timing of the correlation between the locally generated signal and the received GPS signal. Once the timing of the GPS signal is known, establishing the timing between the local signal and the received GPS signal is well known in the art. Since the timing of the received GPS signal is known prior to acquiring the GPS satellite, coherent integration of the correlation can be performed over several code periods. That is, the correlation of each code period can be added to the correlation of other code periods to provide a greater correlation value for the collection of code periods over which the coherent integration is performed.

By detecting the correlation of the locally generated signal to the received GPS signal using a coherent integration over several code periods, a determination can be made as to whether there is a correlation between the locally generated signal and the received GPS signal. If so, a determination is made that a signal transmitted from a satellite associated with the particular code used to encode the locally generated signal is present in the received GPS signal (STEP 807).

Figure 9:
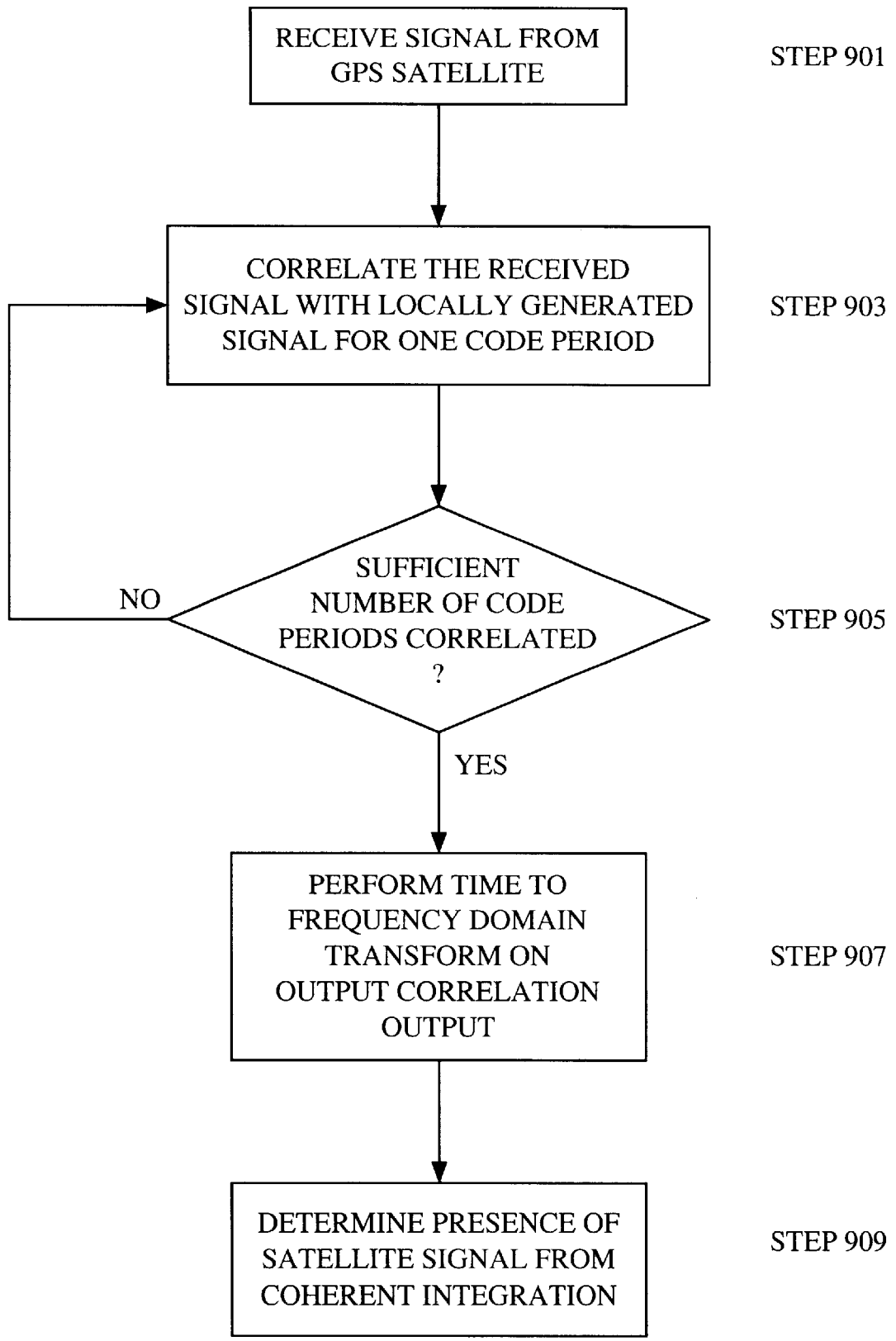
FIG. 9 is a flowchart that illustrates another embodiment of the disclosed method.

FIG. 9 is a flowchart which illustrates another embodiment of the disclosed method. A signal is received from a GPS satellite by the GPS receiver 600 (STEP 901). The received GPS signal is correlated with a locally generated signal for one code period (STEP 903). This process is repeated for a predetermined number of code periods (STEP 905). The output from the correlation process is either stored or passed directly to a time to frequency domain transform processor, such as a digital signal processor capable of performing a fast Fourier transform. The time to frequency domain transform processor performs a time domain to frequency domain transform, such as a discrete Fourier transform on the output values which are the result of each of the correlation processes (STEP 907). Accordingly, a frequency domain representation of the output from the correlator is generated. This frequency domain output is then analyzed to determine whether a signal transmitted from the satellite associated with the particular code used to encode the locally generated signal is present in the received GPS signal (STEP 909).

Industrial Application

This invention is capable of exploitation in industry, and can be made and used, whenever is it desired to increase the sensitivity of a global positioning system receiver. The individual components of the apparatus and method shown herein, taken separate and apart from one another, may be entirely conventional, it being their combination which we claim as our invention.

While we have described various modes of apparatus and method, the true spirit and scope of our invention is not limited thereto, but is limited only by the following claims and their equivalents, and we claim such as our invention.

What is claimed is:

1. A method for improving the sensitivity of a Global Positioning System (GPS) receiver, the method including the steps of:
   a) receiving a GPS signal from a GPS satellite;
   b) determining whether the receiver has a source for synchronization to GPS time other than the GPS satellite itself; and
   c) if there is a source for synchronization to GPS time other than the GPS satellite itself, then:
   1) determining, from the synchronization source, the boundaries of a plurality of code periods in the received GPS signl;

2) determining the amount of power in the received GPS signal by applying a particular code associated with a particular satellite to the received GPS signal during each of the plurality of code periods;
3) summing the power received during each code period to determine a total integrated power over the sum of the plurality of code periods; and
4) processing the received GPS signal using information about the particular satellite if the total integrated power is greater than a threshold value.

2. The method of claim 1, wherein the source for synchronization to GPS time comprises a signal from a Code Division Multiple Access (CDMA) base station.

3. The method of claim 2, wherein the signal from the CDMA base station includes information based on the round trip delay from the GPS receiver to the bases station and back to adjust the offset between CDMA system time and GPS time.

4. The method of claim 1, further including the step of:
d) if there is no source for synchronization to GPS time other than the GPS satellite itself, then:
1) performing a time to frequency domain transform on the power in the received GPS signal encoded with the particular code associated with the particular satellite during each of the plurality of code periods; and
2) processing the received GPS signal using information about the particular satellite if the amount of power in any one of the frequencies in the frequency domain is greater than a predetermined threshold.

5. The method of claim 4, wherein the s ource for synchronization to GPS time comprises a signal from a Code Division Multiple Access (CDMA) base station.

6. The method of claim 5, wher ein the signal fr om the CDMA base station includes information based on the round trip delay from the GPS receiver to the base station and back to adjust the offset between CDMA system time and GPS time.

7. Apparatus for improving the sensitivity of a Global Positioning System (GPS) receiver, the apparatus including:
a) means for receiving a GPS signal from a GPS satellite;
b) means for determining whether the receiver has a source for synchronization to GPS time other than the GPS satellite itself;
c) means, responsive to a determination that there is a source for synchronization to GPS time other than the GPS satellite itself, for:
1) determining, from the synchronization source, the boundaries of a plurality of code periods in the received GPS signal;
2) determining the amount of power in the received GPS signal by applying a particular code associated with a particular satellite to the received GPS signal during each of the plurality of code periods;
3) summing the power received during each code period to determine a total integrated power over the sum of the plurality of code periods; and
4) processing the received GPS signal using information about the particular satellite if the total integrated power is greater than a threshold value.

8. The apparatus of claim 7, wherein the means for determining whether the receiver has a source for synchronization to GPS time, other than the GPS satellite itself, is constructed to respond to a signal from a Code Division Multiple Access (CDMA) base station.

9. The apparatus of claim 8, wherein the means for determining whether the receiver has a source for synchronization to GPS time, other than the GPS satellite itself, is constructed:

a) to respond to information, included in the signal from the CDMA base station, based on the round trip delay from the GPS receiver to the bases station and back; and
b) to thereby adjust the offset between CDMA system time and GPS time.

10. The apparatus of claim 7, further including means, responsive to a determination that there is no source for synchronization to GPS time other than the GPS satellite itself, for:
a) performing a time to frequency domain transform on the power in the received GPS signal encoded with the particular code associated with the particular satellite during each of the plurality of code periods; and
b) processing the received GPS signal using information about the particular satellite if the amount of power in any one of the frequencies in the frequency domain is greater than a predetermined threshold.

11. The apparatus of claim 10, wherein the means for determining whether the receiver has a source for synchronization to GPS time, other than the GPS satellite itself, is constructed to respond to a signal from a Code Division Multiple Access (CDMA) base station.

12. The apparatus of claim 11, wherein the means for determining whether the receiver has a source for synchronization to GPS time, other than the GPS satellite itself, is constructed:
a) to respond to information, included in the signal from the CDMA base station, based on the round trip delay from the GPS receiver to the base station and back; and
b) to thereby adjust the offset between CDMA system time and GPS time.

13. A method for improving the sensitivity of a Global Positioning System (GPS) receiver, the method including the steps of:
a) receiving a GPS signal from a GPS satellite;
b) providing the receiver with a source for synchronization to GPS time, other than the GPS satellite itself;
c) determining, from the synchronization source, the boundaries of a plurality of code periods in the received GPS signal;
d) determining the amount of power in the received GPS signal by applying a particular code associated with a particular satellite to the received GPS signal during each of the plurality of code periods;
e) summing the power received during each code period to determine a total integrated power over the sum of the plurality of code periods; and
f) processing the received GPS signal using information about the particular satellite if the total integrated power is greater than a threshold value.

14. The method of claim 13, wherein the source for synchronization to GPS time comprises a signal from a Code Division Multiple Access (CDMA) base station.

15. The method of claim 14, wherein the signal from the CDMA base station includes information based on the round trip delay from the GPS receiver to the base station and back to adjust the offset between CDMA system time and GPS time.

16. Apparatus for improving the sensitivity of a Global Positioning System (GPS) receiver, the apparatus including:
a) means for receiving a GPS signal from a GPS satellite;
b) means for providing the receiver with a source for synchronization to GPS time, other than the GPS satellite itself;

c) means for determining, from the synchronization source, the boundaries of a plurality of code periods in the received GPS signal;

d) means for determining the amount of power in the received GPS signal by applying a particular code associated with a particular satellite to the received GPS signal during each of the plurality of code periods;

e) means for summing the power received during each code period to determine a total integrated power over the sum of the plurality of code periods; and f) means for processing the received GPS signal using information about the particular satellite if the total integrated power is greater than a threshold value.

17. The apparatus of claim 16, wherein the means for determining whether the receiver has a source for synchronization to GPS time, other than the GPS satellite itself, is constructed to respond to a signal from a Code Division Multiple Access (CDMA) base station.

18. The apparatus of claim 17, wherein the means for determining whether the receiver has a source for synchronization to GPS time, other than the GPS satellite itself, is constructed:

a) to respond to information, included in the signal from the CDMA base station, based on the round trip delay from the GPS receiver to the base station and back; and b) to thereby adjust the offset between CDMA system time and GPS time.

* * * * *